(12) United States Patent
Bao et al.

(10) Patent No.: US 12,430,312 B1
(45) Date of Patent: Sep. 30, 2025

(54) DETERMINING RELATIONSHIPS BETWEEN NODES WITHIN CONNECTED GRAPHS

(71) Applicant: Zoom Communications, Inc., San Jose, CA (US)

(72) Inventors: Yulin Bao, Hefei (CN); Justin Bryce Betteridge, Boise, ID (US); Rongan Chen, Hefei (CN); Zian Fang, Hangzhou (CN); Libin He, Hefei (CN); Gang Liu, Hefei (CN); Yike Liu, Santa Clara, CA (US); Yuan Hung Lo, Mountain View, CA (US); Jiyue Ma, Hangzhou (CN); Arvin Damien Seifipour, Mission Viejo, CA (US); Hao Zhang, Hefei (CN); Huilian Zhao, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/741,391

(22) Filed: Jun. 12, 2024

(51) Int. Cl.
*G06F 16/22* (2019.01)
*G06F 16/242* (2019.01)
(Continued)

(52) U.S. Cl.
CPC ........ *G06F 16/2282* (2019.01); *G06F 16/242* (2019.01); *G06F 16/2456* (2019.01);
(Continued)

(58) Field of Classification Search
CPC ............... G06F 16/2282; G06F 16/242; G06F 16/2456; G06F 16/9024; H04L 65/403; H04L 65/1093
(Continued)

(56) References Cited

U.S. PATENT DOCUMENTS

2015/0026120 A1* 1/2015 Chrapko ............... G06F 16/904
707/748
2017/0097741 A1* 4/2017 Liang .................. G06F 16/9574
(Continued)

*Primary Examiner* — Hicham Skhoun
(74) *Attorney, Agent, or Firm* — Kilpatrick Townsend & Stockton, LLP

(57) ABSTRACT

One example method includes generating, from a relevancy graph, a first table and a second table, the relevancy graph comprising a plurality of nodes and a plurality of edges, wherein each node represents an individual and each edge connects two nodes and represents a relationship between the respective two nodes, the first table comprising information about each node in the relevancy graph and the second table comprising information about each edge in the relevancy graph; selecting a seed node from the plurality of nodes; generating a database query to obtain data for a relevancy table based on a set of neighbor nodes to the seed node and a set of corresponding edges connecting the seed node to each neighbor node of the set of neighbor nodes; distributing, to a plurality of computing nodes, portions of the database query to determine, in parallel, probability information for the relevancy table; generating the relevancy table comprising the seed node, the set of neighbor nodes, and, for the seed node and each neighbor node, a corresponding probability based on the probability information; receiving, from a remote computing device, a request related to an individual and a software service offered by a service provider; and determining and providing, to the remote computing device based on the relevancy table, information about a relationship between the individual and one or more individuals represented in the relevancy graph/.

20 Claims, 11 Drawing Sheets

(51) Int. Cl.
  *G06F 16/2455* (2019.01)
  *G06F 16/901* (2019.01)
  *H04L 65/403* (2022.01)
  *H04L 65/1093* (2022.01)
(52) U.S. Cl.
  CPC ........ *G06F 16/9024* (2019.01); *H04L 65/403* (2013.01); *H04L 65/1093* (2013.01)
(58) Field of Classification Search
  USPC ........................................................ 707/741
  See application file for complete search history.

(56) References Cited

U.S. PATENT DOCUMENTS

| | | | |
|---|---|---|---|
| 2019/0303494 A1* | 10/2019 | Meyer .................... | G06Q 30/01 |
| 2021/0209500 A1* | 7/2021 | Hu ........................... | G06N 5/04 |
| 2022/0172090 A1* | 6/2022 | Zheng ................. | G06F 16/9024 |
| 2024/0193440 A1* | 6/2024 | Shrivastava ........... | G06N 5/025 |

* cited by examiner

SCHEDULE NEW MEETING
440

SUBJECT

[ Subject... ]

DATE & TIME

[ Start Date ] [ Start Time ] [ End Date ] [ End Time ]

INVITE ATTENDEES

[ Email or name... ]

[ Schedule ]   [ Cancel ]

*FIG. 4B*

SCHEDULE NEW MEETING
440

TOPIC

[ Topic... ]

DATE & TIME

[ Start Date ] [ Start Time ] [ End Date ] [ End Time ]

INVITE ATTENDEES

|
John Smith
Jane Doe — 450
Scott Johnson
Brenda Williams

*FIG. 4C*

DETERMINING RELATIONSHIPS BETWEEN NODES WITHIN CONNECTED GRAPHS

FIELD

The present application generally relates to connected graphs and more particular relates to determining relationships between nodes within connected graphs.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 4A-4C show example graphical user interfaces for determining relationships between nodes within connected graphs;

DETAILED DESCRIPTION

Figure 1:
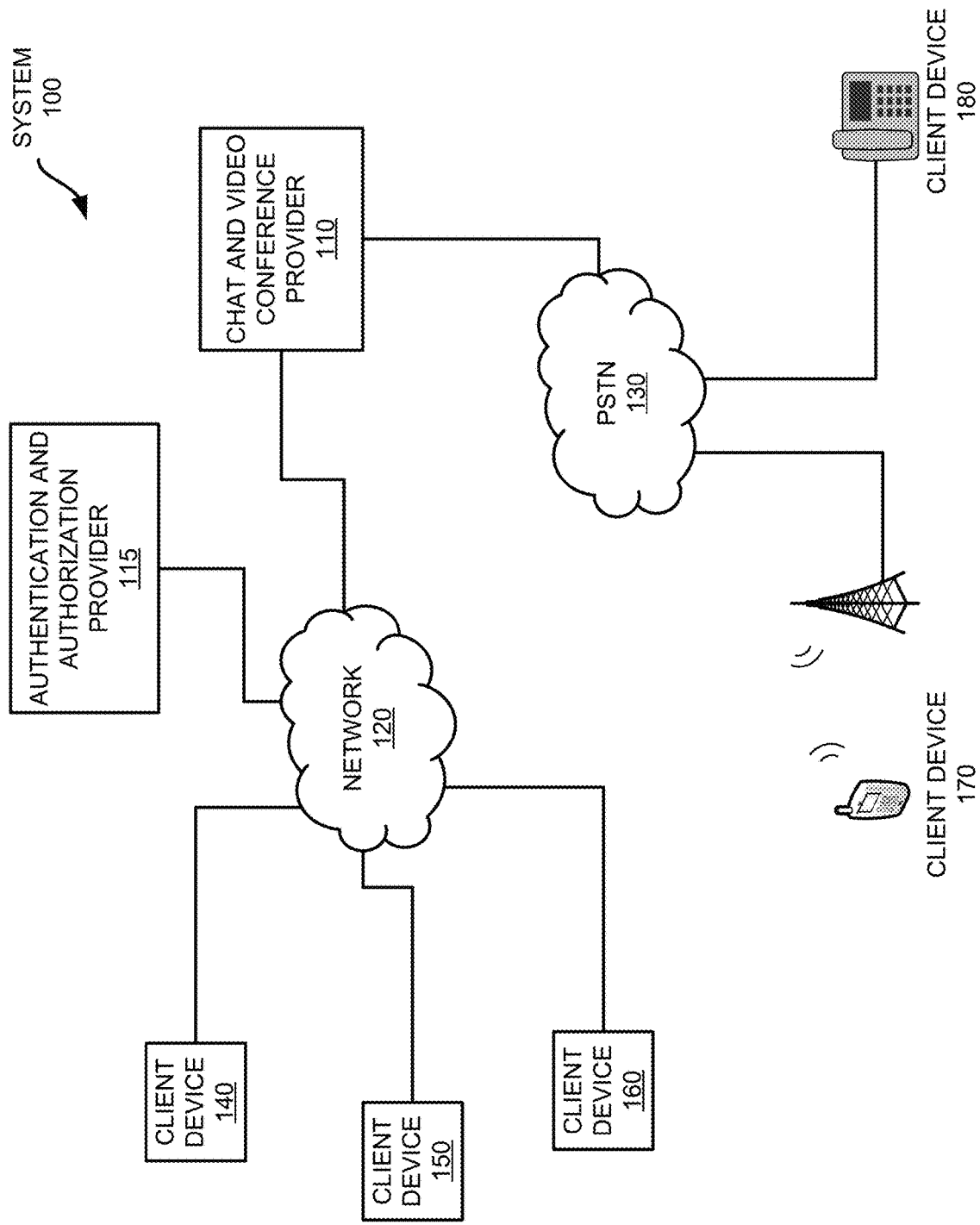
FIGS. 1-2 show example systems for determining relationships between nodes within connected graphs.

Examples are described herein in the context of determining relationships between nodes within connected graphs. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

When users of interactive communication services interact with an offered service, the service provider may desire to provide recommendations of other users that the user may wish to engage with as a part of the offered service. For example, when a user seeks to schedule a virtual meeting using a virtual conferencing provider, the virtual conference provider may provide the user with recommended invitees to the virtual meeting. However, identifying relevant users can be a difficult process. Certain naïve approaches may be used, such as by searching a user's contact directory and suggesting names from it. However, more nuanced approaches to identify other users who are likely highly relevant to particular person in a particular context are much more difficult.

To help determine relevant users, a service provider, such as a virtual conference provider, may develop and maintain a social graph that includes all of the users of the service. A social graph includes a large number of "nodes," each of which represents one of the users of the service provider, and a large number of "edges," with each edge connecting two nodes and representing a relationship between those nodes and a strength of the relationship. The edges within the social graph can then be used to determine relationships to users that may not be directly connected another user by an edge, i.e., there is an indirect connection from one user to another via one or more intervening users.

However, in a large social graph, such as one that has hundreds of millions or even billions of nodes, determining such relationships can be computationally expensive, particularly when a large number of requests for relationships between nodes are submitted over a short period of time. In systems that have hundreds of millions of users, such requests may be sent essentially continuously as the various users all take advantage of services offered by the service provider that involve connecting with other users.

To help ensure that such information is readily available when needed, the system may pre-determine relationship information between the users within the social graph so that when requests are received, relationship information can be quickly determined by accessing the pre-determined relationship information. However, generating such information remains computationally expensive due to the large number of users and relationships represented in the social graph. Moreover, because edges within the social graph are updated as various users interact with each other, any pre-determined relationship information may be very quickly become outdated. Thus, the service provider must repeatedly pre-determine relationship information, e.g., daily, to ensure it remains fresh enough to provide accurate relationship information.

To pre-determine relationship information, the service provider can use the nodes and edges in the social graph to generate two tables, one representing the nodes and a second representing the edges. The service provider then selects a particular node in the social graph as a "seed" node to begin a relationship analysis. It then begins a random walk with restart ("RWR") algorithm by issuing an initial database query based on the seed node to obtain nodes that are directly connected to the seed node by an edge and the corresponding edges. For each node, it determines a probability of either re-starting the analysis from the seed node or by selecting one or more directly connected nodes. It then issues a second database query to obtain additional nodes directly connected to one of the selected nodes, but indirectly connected to the seed node and re-determining corresponding probabilities for all obtained nodes to that point. The system then determines whether to return to the seed node or select a new node to continue the traversal of the social graph. This process continues until the response to a database query results in a change to the prior query's results that does not satisfy a predetermined threshold. Using the data, the system can then determine the relationship information for the seed node to each node returned by a database query and store the relationship information in a predetermined relationship data store.

The system then repeats this process for each node in the social graph. As is apparent, performing such a technique rapidly becomes intractable on a single computing device. Thus, the technique is structured to easily enable distribution across multiple computing devices. To do so, each database query, e.g., each JOIN, is allocated to a particular computing device from a set of available computing devices, which allows them to be performed in parallel, with the results reported to an orchestrator where they are combined.

Because such a technique allows the workload required for the RWR to be easily distributed over a large number of computing devices, the time needed to determine relationship information for every node in the social graph is significantly reduced. Further, by using particular database queries, discussed in more detail below, the number of calculations required to determine relationship information for a particular seed node can be significantly reduced.

This illustrative example is given to introduce the reader to the general subject matter discussed herein and the disclosure is not limited to this example. The following sections describe various additional non-limiting examples and examples of determining relationships between nodes within connected graphs.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
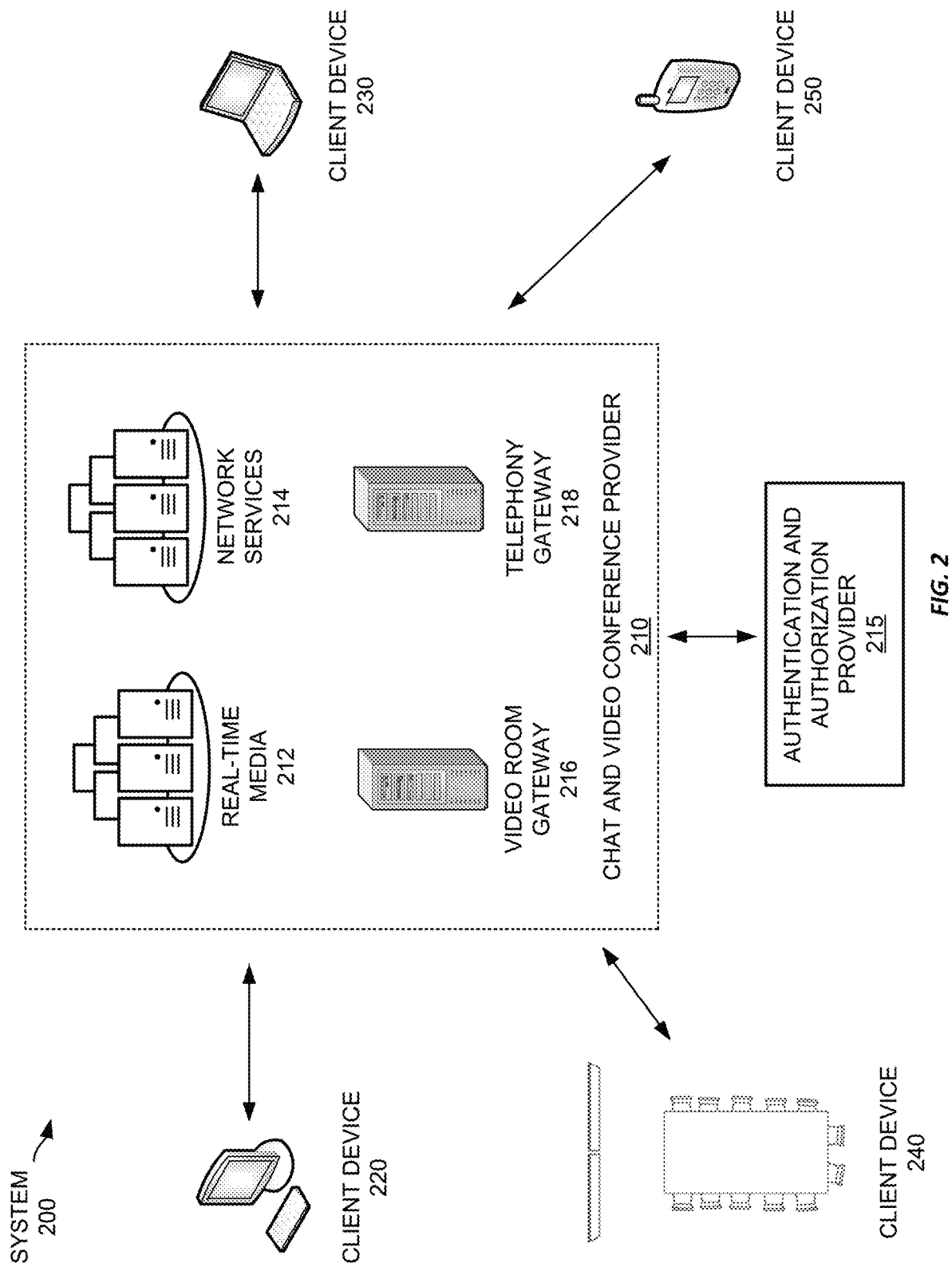

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
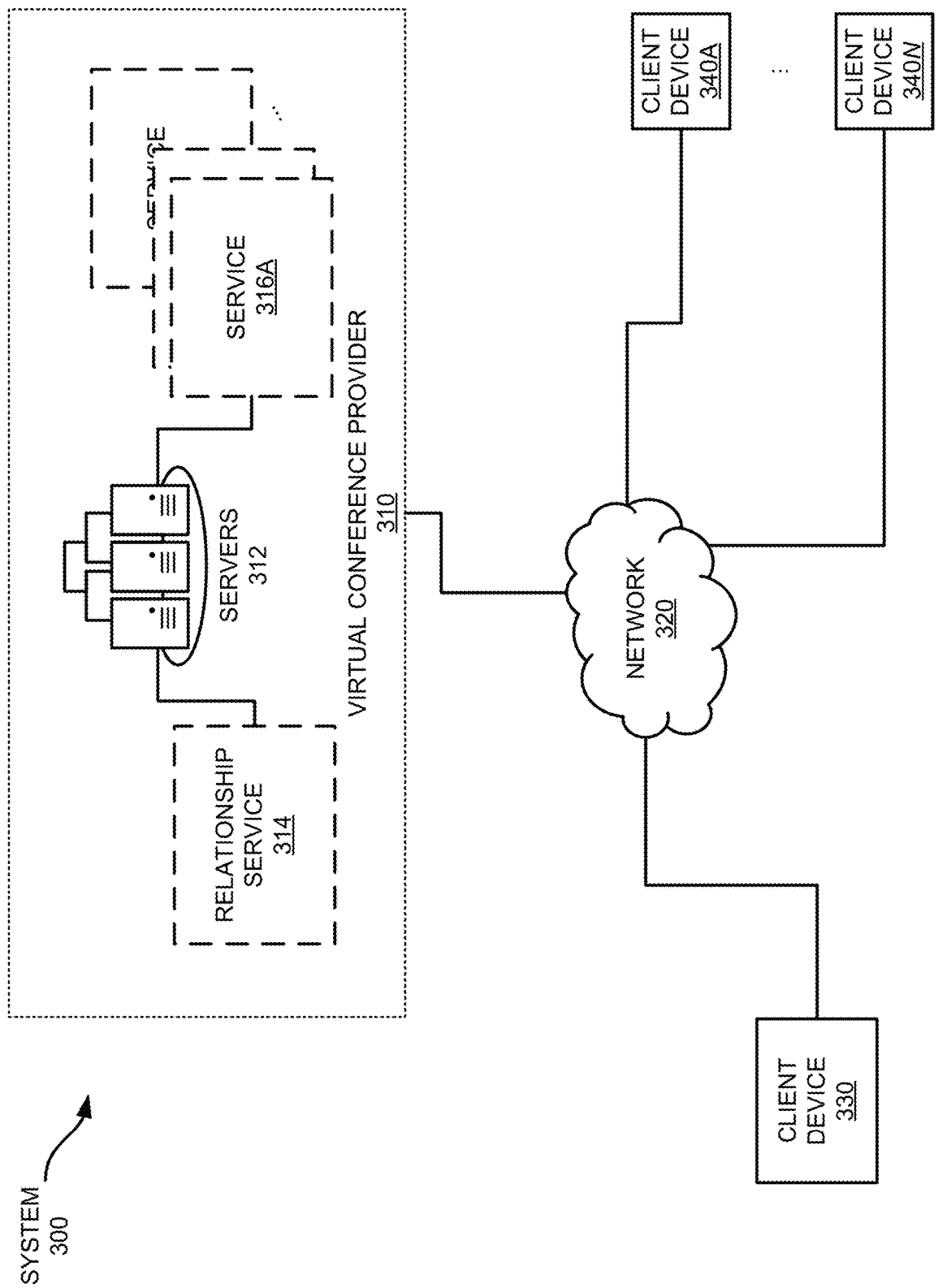
FIGS. 3A-3B and 3D show an example system for determining relationships between nodes within connected graphs.

Referring now to FIG. 3A, FIG. 3A illustrates an example system for determining relationships between nodes within connected graphs. The example system includes a virtual conference provider 310 that provides a variety of services 316a-n as well as a relationship service 314 to its users, such as those that engage in video or audio conferencing hosted by the virtual conference provider 310. The virtual conference provider 310 manages a number of servers 312 to provide virtual conferencing functionality, generally as described above with respect to FIGS. 1-2. In addition, these servers provide services that can be accessed during or outside of a virtual conference, such as to enable chat channels, virtual whiteboard or other collaboration services, workspace reservation or scheduling systems, or any other service of interest.

Multiple client devices 330, 340a-n may connect to the virtual conference provider 310 to engage in virtual conferences or take advantage of the services 316a-n offered by the virtual conference provider 310. In the context of a virtual conference, the user of client device 330 may initiate a virtual conference as the host, and users of client device 340a-n may join the virtual conference as participants. However, when initially scheduling the virtual conference, the user of the client device 330 may need to identify the correct set of people to invite or may simply need to search for contact information. To do so, the user may interact with a graphical user interface ("GUI") of a client application to provide a title for the virtual conference, a scheduled start time and end time (or duration), and one or more attendees to invite.

While a user may readily have a list of invitees available and may be able to cut and paste the invitees into the virtual conference invitation, in some examples, the user may need to manually enter or select invitees. To assist the user in this process, the virtual conference provider 310 may access the relationship service 314 to obtain potential people to suggest to invite to the virtual conference. For example, if the user selects a portion of the GUI that relates to identifying invitees, the client application may transmit an indication to the virtual conference provider 310 that the user is attempting to identify invitees to the meeting and request one or more suggested invitees. The virtual conference provider 310 may then employ relationship service 314 to provide the one or more suggested invitees. In this example, the relationship service periodically updates, for each registered user of the virtual conference provider 310, a list of people who are highly relevant to that particular registered user. Thus, each registered user of the virtual conference provider 310, e.g., each user who has created an account with the virtual conference provider 310, may have a list of other users and an indication of their relevancy to that user.

After accessing the relationship service, the virtual conference provider 310 may provide one or more relevant users from the list maintained by the relationship service 314. The client application may then present to the user one or more of the relevant users as suggested invitees to the virtual conference. The user may then select any of the suggested invitees to invite to the meeting.

Figure 3B:
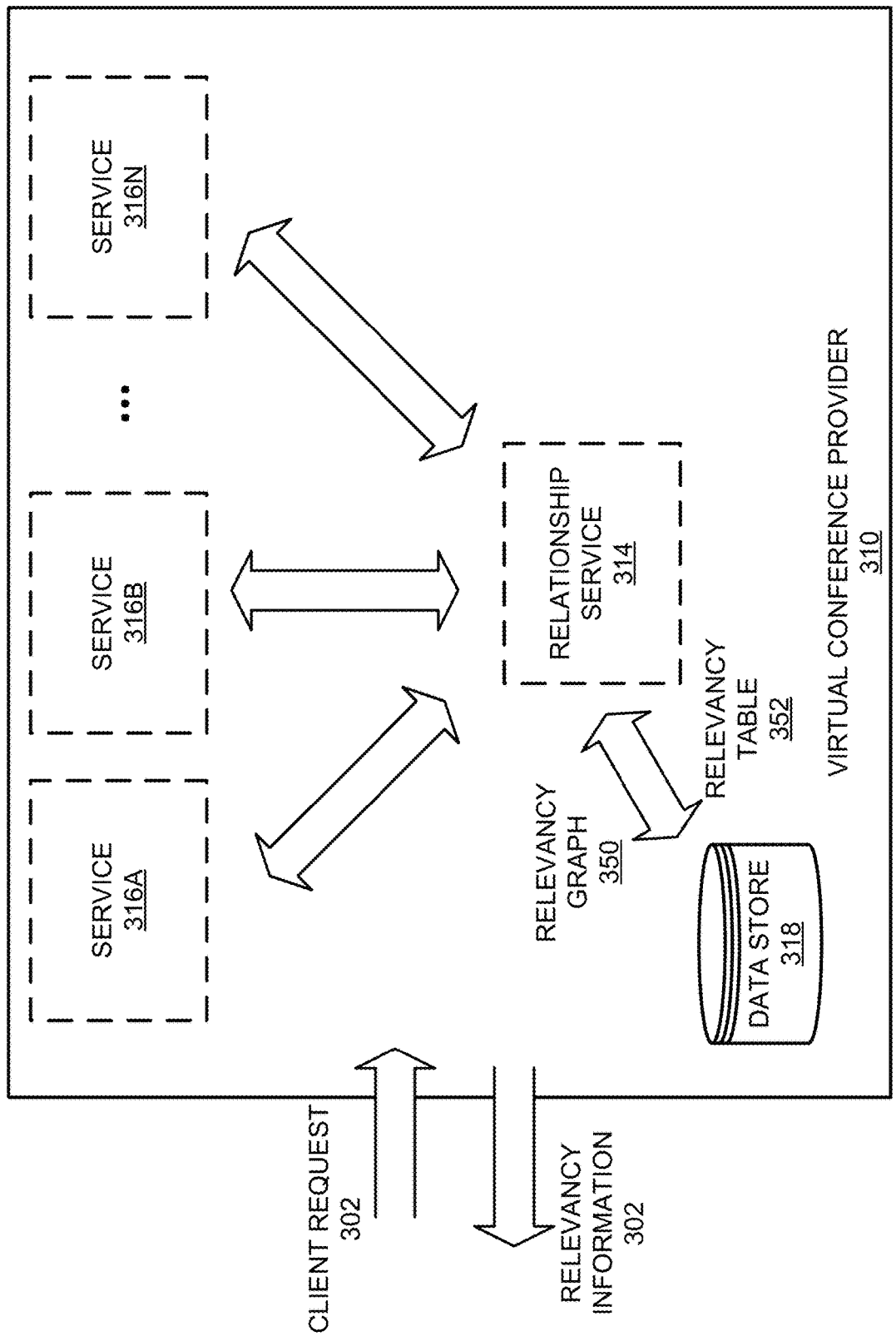

Referring now to FIG. 3B, FIG. 3B shows an example system for determining relationships between nodes within connected graphs. Specifically, FIG. 3B shows the virtual conference provider 310 and interactions with client devices and between services 316a-n and the relationship service 314. As can be seen in this example, the virtual conference provider 310 receives client requests 302 related to one or more of the services 316a-n provided by the virtual conference provider 310 that may be invoked by the user, as discussed above with respect to FIG. 3A. As a user interacts with a service 316a-n, the service 316a-n may provide suggested users to the user based on information received from the relationship service 314. For example, a user interacting with a chat channel may desire to send a message to one or more other users and the chat channel service may transmit a request to the relationship service 314 for one or more suggested recipients of the message. The relationship service 314 responds with one or more relevant users obtained from a relevancy table 352 stored in a data store 318.

The relevancy table 352 itself is created by the relationship service 314 based on the contents of a relevancy graph 350 that is also stored by the data store 318. A relevancy graph includes a set of nodes, each of which represents a user of the virtual conference provider, and a set of edges, each of which connects two nodes to each other and represents a relationship between the two nodes. From the set of nodes and edges in the relevancy graph 350, the relationship service 314 can determine the relevancy of other users to a particular user, e.g., a user who provides a client request 302 to the virtual conference provider.

Figure 3C:
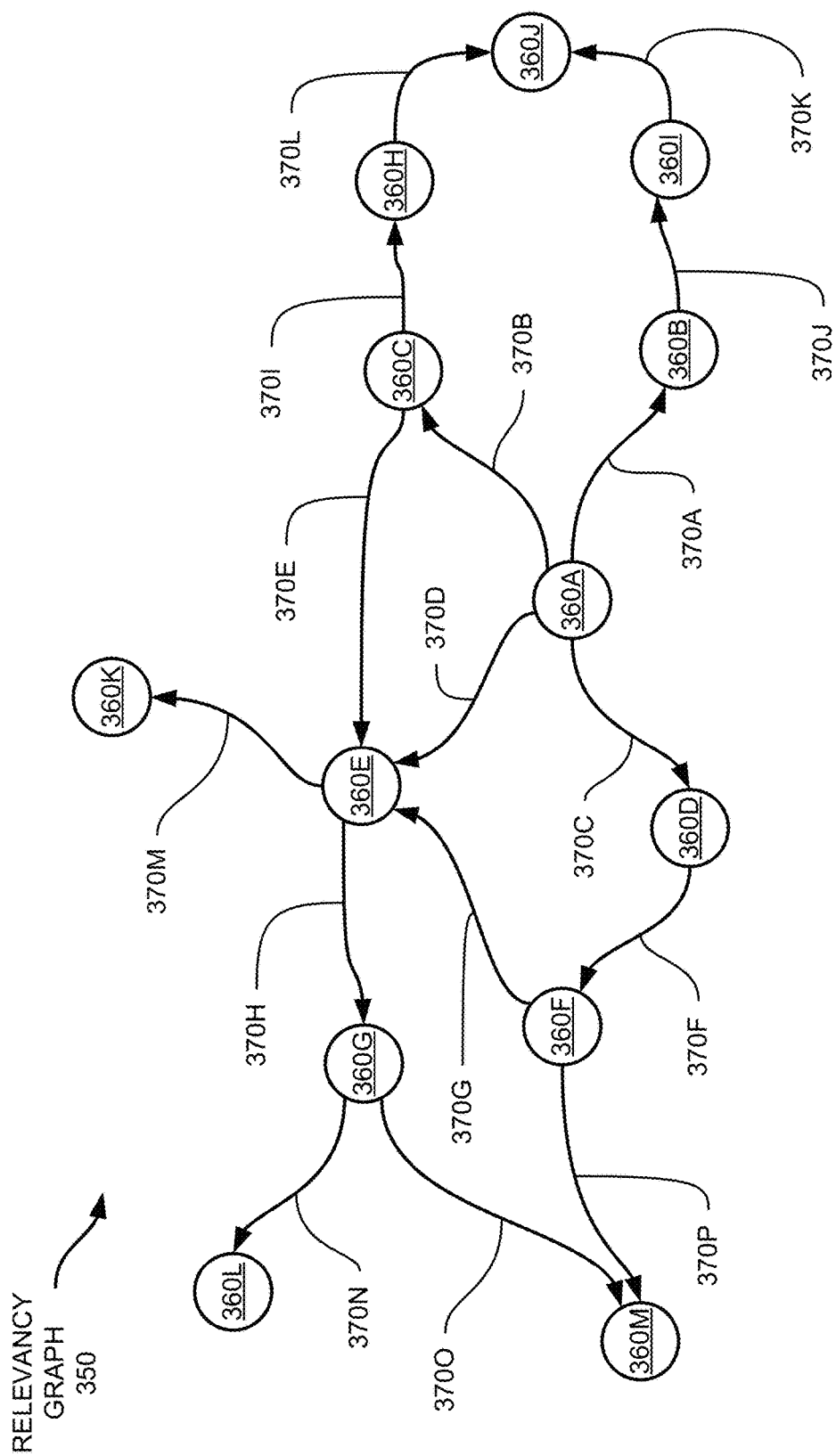
FIG. 3C shows an example relevancy graph.

Referring to FIG. 3C, FIG. 3C shows an example relevancy graph 350. The relevancy graph 350 includes a set of nodes 360a-m and a set of edges 370a-p. As mentioned above with respect to FIG. 3B, each node represents a different user of the virtual conference provider 310. In this example, each registered user of the virtual conference provider 310 is represented by a node in the relevancy graph. However, in some examples, any user who has been interacted with the virtual conference provider 310, whether a registered user or not, may be represented in the relevancy graph 350. For example, if a non-registered user participates in a virtual conference, a node may be created in the relevancy graph corresponding to that non-registered user, which may include the information used to access the virtual conference, such as an email address or a name.

Each edge in the relevancy graph represents a relationship from one person to another person and has a corresponding weight indicating the strength of the relationship. For example, in the relevancy graph 350 shown in FIG. 3C, the user represented by node 360a is directly related to the users represented by nodes 360b-e, as indicated by edges 370a-d, respectively. These nodes may be referred to as first-degree neighbor nodes. Nodes that are indirectly connected by one or more intervening nodes (and corresponding edges) may be referred to as second-degree, third-degree, etc., neighbor nodes depending on the number of intervening nodes that must be visited by the explorer before arriving at a particular node. And generally, a node that has a connection (direct or indirect) to another node may be referred to as a neighbor node, without specifying the degree of that relationship.

The direction of the arrow on each edge indicates the starting point for the relationship, e.g., if the relationship service 314 analyzes node 360a, edges beginning at node 360a represent a relationship that the user for node 360a has with another user, e.g., node 360b. Similarly, node 360b may have an edge that connects to node 360a. However, the view of the relevancy graph 350 in FIG. 3C is from the perspective of the user represented by node 360a, and thus does not show the edge originating at node 360b and connecting to node 360a. However, such a node exists in this relevancy graph 350.

In general, the relevancy graph 350 employs two edges between related nodes because each edge also represents a strength of a relationship between two nodes and thus, the relevancy of node 360b to node 360a may be different from the relevancy of node 360a to node 360b. Thus, by providing two different edges between two nodes, the relationship information may be more accurately reflected, depending on which node is under consideration. However, some examples, may only employ a single, non-directed edge between two nodes to represent a bi-directional relevancy between the two nodes.

In addition, as can be seen, each node in the relevancy graph 350 does not have a direct connection to every other node in the relevancy graph 350. The lack of a direct connection may indicate that the two users (e.g., represented by nodes 360a and 360g) have not directly interacted or are not part of the same chat channel or other service offered by the virtual conference provider 310. However, as can be seen, nodes that are not directly connected by an edge may still be indirectly connected via one or more intervening nodes and corresponding edges. For example, the user represented by node 360g is indirectly related to the user represented by node 360a by way of node 360e or via nodes 360d-360f-360e. In real-world terms, the users represented by 360a-e may be personal friends, while the person represented by node 360g may be a personal friend of the person represented by node 360e, but may have never met the person represented by node 360a.

It should be appreciated that the relevancy graph shown in FIG. 3C is a small-scale example to introduce certain concepts. A relevancy graph for a virtual conference provider or other service provider may have many thousands, millions, or even billions of nodes as well as a correspondingly large number of edges, representing all of the relationships between all of the users of the virtual conference provider or other service provider.

Referring again to FIG. 3B, to provide recommendations of potentially relevant people to users of the virtual conference provider 310, the relationship service 314 may analyze the relevancy graph 350 to identify other relevant users for the user that submitted the client request 302. However, traversing the relevancy graph in real-time to response to client requests 302 or requests received from the various services 316a-n is prohibitively computationally expensive. Further, because the relevancy graph 350 can change over time based on new users or relationships being added, or edges being updated based on interactions that occur between different users. Thus, to help ensure relationship information is available as needed, the relationship service periodically analyzes the relevancy graph 350 to generate a set of relationships based on a then-current state of the nodes and edges in the relevancy graph 350.

To generate the relationship information, the relationship service 314 generates two tables based on the relevancy graph 350: a node table and an edge table. The edge table includes at least three columns that store the originating node, the destination node, and the weight of the edge. The following is an example partial edge table corresponding to the relevancy graph 350 of FIG. 3C:

| Origin | Destination | Weight |
|--------|-------------|--------|
| 360a | 360b | 3 |
| 360a | 360c | 2 |
| 360a | 360d | 1 |
| 360a | 360e | 1 |
| 360b | 360i | 1 |
| 360c | 360e | 1 |
| 360c | 360h | 2 |
| ... | ... | ... |

While weight information is not shown in FIG. 3C, as discussed above, each edge has a corresponding weight stored in the relevancy graph 350.

The node table includes at least two columns that identify each node in the table and the corresponding sum of the weights of all edges originating at the respective node. The following is an example partial node table corresponding to the relevancy graph 350 of FIG. 3C:

| Node | Total Weight |
|------|--------------|
| 360a | 7 |
| 360b | 1 |
| 360c | 3 |
| ... | ... |

Once the node and edge tables have been constructed, the relationship service 314 generates relationship information using a RWR algorithm starting at each node in the relevancy graph 350.

To perform the RWR algorithm for a particular node, referred to as the "seed node," the relationship service generates a pointer or "explorer" that traverses the graph over a number of iterations. At each iteration, the explorer has a probability of selecting an edge to traverse to a new node or of selecting the option to return to the seed node. Selecting the edge to traverse is based on the weight of each candidate edge, while the probability of returning to the seed node is statically selected—referred to as probability a for this discussion. Thus, the available edge with the highest weight is the most likely to be selected of the available edges.

The relationship service 314 then repeats these selections as it traverses the edges and records the number of times the explorer visits each vertex. For example, if the sequence of nodes selected by the explorer in the first ten iterations is (360a, 360c, 360e, 360a, 360b, 360a, 360c, 360a, 360e, 360g). In the first ten iterations, 360a is visited with probability 0.4, 360b with probability 0.1, 360c with probability 0.2, 360d with probability 0.0, 360e with probability 0.2, 360f with probability 0.0, and 360g with probability 0.1. Over a sufficient number of iterations, the probabilities may gradually stabilize, so that eventually the quantized value of each node beginning with 360a will be obtained.

Over the course of the iterations, the relationship service constructs a table reflecting the probabilities of the explorer's traversal of the relevancy graph 350 from the seed node.

For the first iteration, where the explorer is located at the seed node, the table is initialized as follows:

| Seed Node | Current Vertex | Probability |
|-----------|----------------|-------------|
| 360a | 360a | 1 |

For each iteration, the relationship service issues a database command to obtain the possible edges to traverse and the respective probabilities, based on a:

```
SELECT seeds, currentVertex, sum(probability) as probability
FROM (
    SELECT    explorer_position.seeds AS seeds,
              table_edges.dst AS currentVertex,
              (1 − a) * explorer_position.probability *
              (table_edges.weight / table_nodes.totalWeight)
              AS probability
    FROM explorer_position
    INNER JOIN table_nodes ON explorer_position.currentVertex =
    table_nodes.id
```

```
                INNER JOIN table_edges ON explorer_position.currentVertex =
                    table_edges.src
                UNION
                SELECT       id AS seeds,
                             id AS currentVertex,
                                           a AS probability
                             FROM table_nodes
                )
                GROUP BY seeds, currentVertex
```

After the next iteration, the explorer table has the following contents:

| Seed Node | Current Vertex | Probability |
|---|---|---|
| 360a | 360a | a |
| 360a | 360b | (1 − a) * (3/7) |
| 360a | 360c | (1 − a) * (2/7) |
| 360a | 360d | (1 − a) * (1/7) |
| 360a | 360e | (1 − a) * (1/7) |

Thus, the probability that the explorer remained at node 360a is a, which was defined as the static probability for any iteration of the explorer returning to the seed node. For the remaining nodes, the probability is a fraction of the remaining probability (out of 100%, or 1), weighted by the edge connecting the starting node with the destination node. Thus, the probability that the explorer traverses edge 370a to node 360b is the weight of edge 370a (3) divided by the total weights of all edges leaving node 370a (7) and multiplied against the remaining probability out of 1, reduced by the probability of remaining at node 360a (a). If a is selected as 0.1, then the table will have the following values:

| Seed Node | Current Vertex | Probability |
|---|---|---|
| 360a | 360a | 0.1 (10%) |
| 360a | 360b | 0.386 (38.6%) |
| 360a | 360c | 0.257 (25.7%) |
| 360a | 360d | 0.129 (12.9%) |
| 360a | 360e | 0.129 (12.9%) |

The RWR algorithm then proceeds to the next iteration, which results in the following explorer table:

| Seed Node | Current Vertex | Probability |
|---|---|---|
| 360a | 360a | a |
| 360a | 360b | (1 − a) * (3/7) |
| 360a | 360c | (1 − a) * (2/7) |
| 360a | 360d | (1 − a) * (1/7) |
| 360a | 360e | (1 − a) * (1/7) + (1 − a)$^2$ * (2/7) * (1/3) |
| 360a | 360f | (1 − a)$^2$ * (1/7) * (2/2) |
| 360a | 360g | (1 − a)$^2$ * (1/7) * (1/2) |
| ... | ... | ... |

Generally, the probabilities at iterations may be determined according to the following equation:

$$P_{t+1}^T = (1-a)MP_t^T + aP_0^T$$

Where the data in $P^T$ corresponds to the contents of the explorer table and the data in M corresponds to the contents of the edge table. Thus, for iteration t+1, it computes the probability based on the probabilities in the previous iteration and the probability of restarting. This equation can be expanded as follows:

$$P_t^T = ((1-a)M)^t P_0^T + a((1-a)M)^{t-1} P_0^T + a((1-a)M)^{t-2} P_0^T + \ldots + a((1-a)M) P_0^T + a P_0^T$$

If $P^T$ is the probability distribution at a time t without a restart, and $P_0$ is the initial position in the graph (at the seed node), then:

$$\overline{P}_t^T = M^t P_0^T$$

Thus, we arrive at the following probability distribution:

$$P_t^T = (1-a)^t \overline{P}_t^T + a \sum_{i=0}^{t-1} (1-a)^i \overline{P}_i^T$$

If the relevancy graph 350 is a fully connected graph, then as t tends to infinity, the distribution is more spread out on the graph, with a low probability of distribution at each node. Thus, in this case, $P^{t-1}$ is approximated to 0 and the equation above is approximated as:

$$P_t^T = a \sum_{i=0}^{t} 0(1-a)^i \overline{P}_i^T$$

This allows the database query above to be reduced in complexity to the following:

```
SELECT seeds, currentVertex, sum(probability) as probability
FROM (
    SELECT       explorer_position.seeds AS seeds,
                 table_edges.dst AS currentVertex,
                 (1 − a) * explorer_position.probability *
                 (table_edges.weight / table_nodes.totalWeight)
                 AS probability
    FROM explorer_position
    INNER JOIN table_nodes ON explorer_position.currentVertex =
        table_nodes.id
    INNER JOIN table_edges ON explorer_position.currentVertex =
        table_edges.src
)
GROUP BY seeds, currentVertex
```

The further reduced database query eliminates a significant amount of data from the generated table and further eliminates a significant number of calculations by eliminating the UNION operation. The code can be further enhanced by filtering any records that have a very low probability by adding the following statement:

WHERE explorer_position.probability>=0.0001

And while the threshold is set at 0.0001 in this example, any suitable threshold may be employed. This can significantly reduce the computational and memory burdens on the relationship service 314.

However, even after simplifying the database query as above, for a large relevancy graph, the computational burden to compute probability information for each node in the graph, i.e., each node is used as the seed node and probabilities are determined, is significant. Thus, examples according to this disclosure may distribute the database query across multiple different executive processes (referred to as "executors"), which may be distributed across multiple different computing devices to process the database query.

Figure 3D:
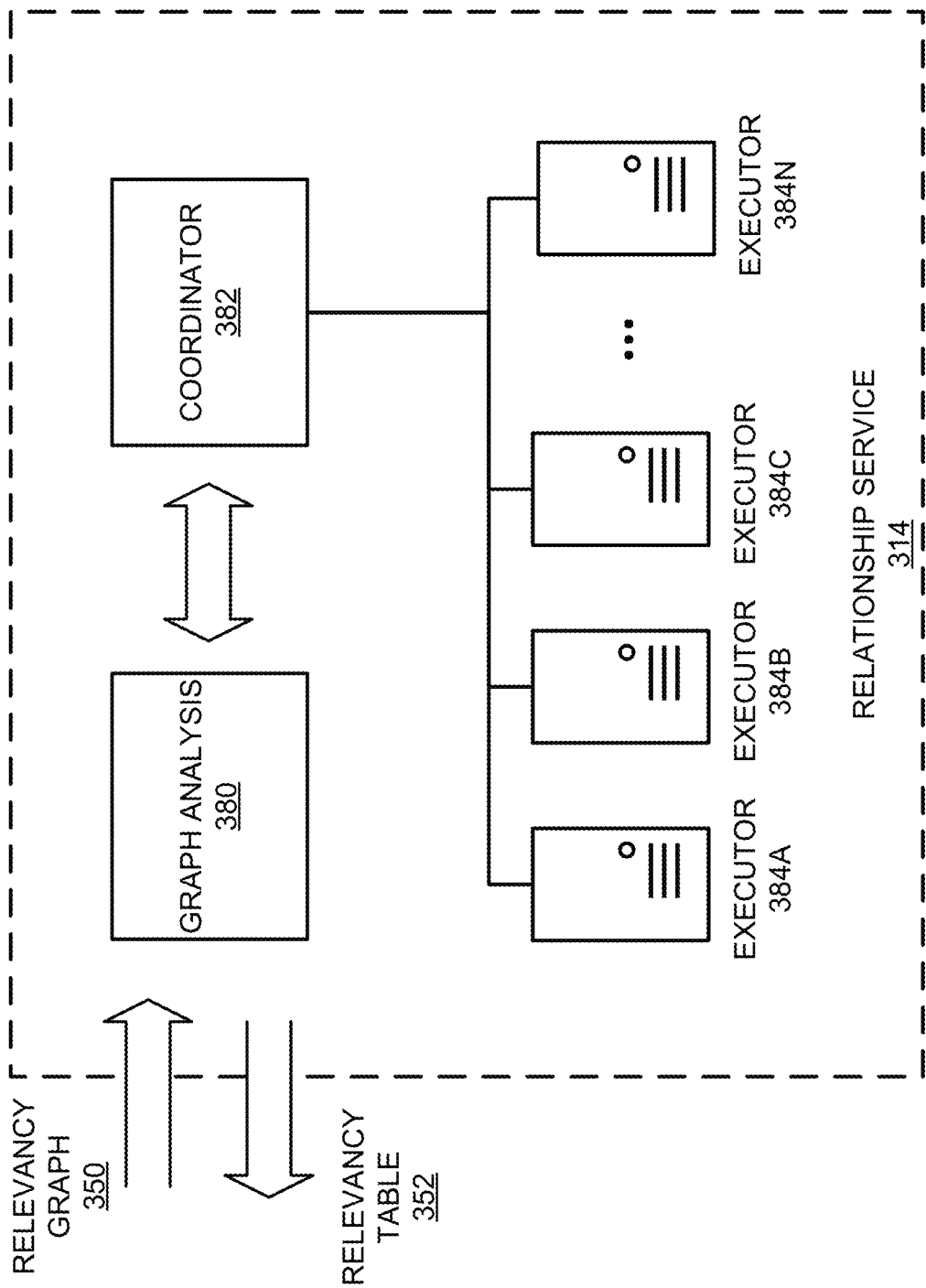

Referring now to FIG. 3D, FIG. 3D illustrates an example architecture of the relationship service 314, which includes graph analysis functionality 380, a coordinator 382, and multiple executors 384a-n. In this example, the Apache Spark™ engine and executors are used, any suitable orchestrator and executors may be employed. When performing the RWR algorithm as discussed above, each iteration involves issuing database commands, e.g., a JOIN command, that can involve significant processing. Thus, to spread the computational burden, the graph analysis functionality 380 can generate database queries, such as discussed above, and provide them to the coordinator 380, which then distributes portions of the database query to different executors 384*a-n*. For example, the JOIN commands in the database command above may involve performing joins of multiple different tables, e.g., for seed node 360*a*, joins are performed for each of nodes 360*b-e* for the first iteration. In a large graph, such a JOIN can involve significant computation. Thus, the coordinator 382 can allocate the JOINs to different executors, such as by allocating the JOINs for node 360*b* to executor 384A, the JOINs for node 360*c*, to executor 384B, and so forth. By doing so, the computational burden can be significantly distributed and therefore the problem of how to generate probability tables for every node in the graph, potentially hundreds of millions or billions, becomes tractable in a reasonable amount of time, such as in a few hours.

Further, because such large graphs may include nodes that have thousands or millions of edges emanating from them, computational complexity can be further reduced by applying a predetermined limit on the number of edges at a particular node that are eligible for the explorer to traverse based on their respective weights, e.g., the one hundred edges with the greatest weights (or lowest weights, depending on the weighting convention used). In this example, the predetermined limit is set based on Dunbar's number, which is generally regarded as being 150, though it was initially determined to be 148. Dunbar's number represents the number of people that any individual is capable of having a stable social relationship with. Thus, while a limit of 148 or 150 may be used, examples may use slightly larger values based on Dunbar's number to provide flexibility, such as a 10% increase. Thus, while a limit of 150 is selected in this example, any suitable predetermined limit may be selected. And some examples may not use a specific limit of edges, but may instead (or in addition to such an edge limit) employ a weight threshold that must be satisfied by an edge to be eligible for use by the explorer.

After generating the probability tables for each node in the relevancy graph, the graph analysis functionality 380 outputs a relevancy table 352 that aggregates all of the generated probability tables, which is stored in the data store 318. However, because user interactions over time can affect the relevancy graph, such as by changing weights on various edges or by adding new nodes, to ensure that the relevancy table 352 remains fresh, it is periodically regenerated. In this example, the virtual conference provider 310 regenerates the relevancy table 352 daily. However, other periods may be used, such as every two days, weekly, or every two weeks. The periodicity may be selected on the rate of expected changes to the graph. Further, if the rate of expected changes varies over time, the virtual conference provider 310 may adjust the rate at which it regenerates the relevancy table 352.

Once the relevancy table 352 has been generated, services 316*a-n* may request potentially relevant people based on client requests 302 they receive. For example, a user attempting to reserve a workspace in a physical office building may interact with a reservation service. The reservation service may provide the user with a view of the floorplan in the office building and may issue a query to the relationship service 314 for users who are relevant to the requesting user. Or it may supply information about other users who have already reserved workspaces in the office building and ask for their relevancy to the requesting user. Based on the received relevancy information, the reservation service may color code available workspaces based on their proximity to people that are highly relevant to the requesting user. This may allow the requesting user to select a workspace near teammates, friends, or other people they interact with regularly.

Figure 4A:
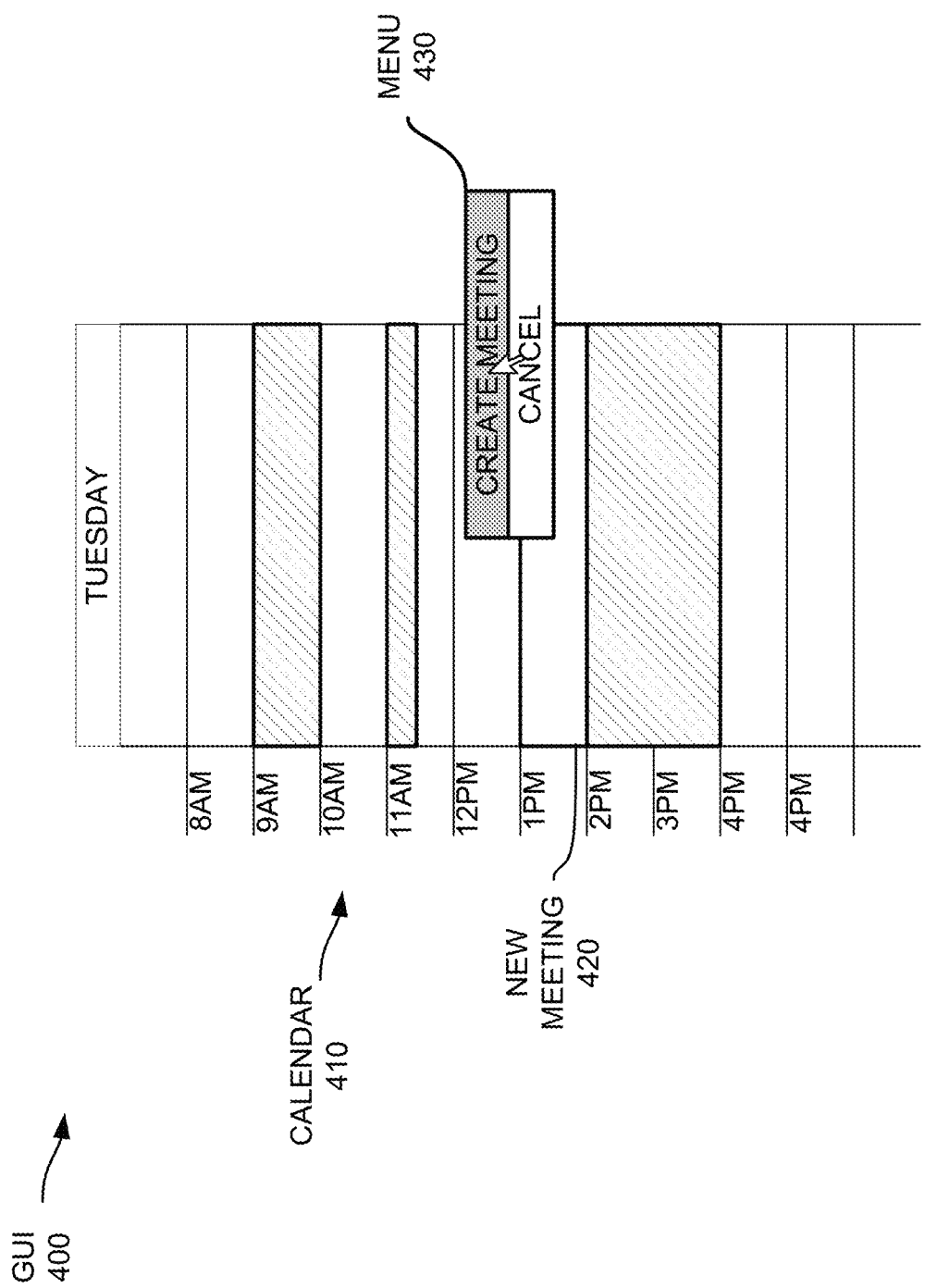

Referring now to FIG. 4A, FIG. 4A illustrates an example use-case for determining relationships between nodes within connected graphs. In this example, a user is interacting with a GUI for a calendar application that illustrates the user's schedule for Tuesday, which includes a number of scheduled meetings, represented by hashed blocks within the schedule. The user is attempting to create a new meeting 420 from 1-2 pm and has opened a menu 430 and selected the "create meeting" option.

FIG. 4B illustrates a dialog box 440 to schedule a new meeting that has been created by the GUI 400. The dialog box allows the user to set various parameters for the meeting, such as the meeting subject, start and end dates and times, and a field to invite attendees to the meeting. Ordinarily, a user would need to manually enter a person's name or email address, which may involve searching through past emails or meeting invitations to find the appropriate email address. In addition, they may also need to spend time considering who the correct set of attendees should be.

Referring to FIG. 4C, FIG. 4C illustrates the dialog box 440 where the calendar application has suggested several names to the user as potential invitees. In this example, the calendar application transmits a client request 302 to the relationship service 314, which accesses the relevancy table and identifies high-probability relationships for the user and responds with one or more individuals corresponding to those relationships. In this example, the dialog box 440 provides four visible options, though more may have been provided by the relationship service 314 and may be accessed by scrolling down through the list of names. The user can then select one or more users to include as invitees.

The relationship service 314 is able to regenerate the relevancy table 352 on a regular basis because it is able to take advantage of the techniques discussed in this disclosure. Thus, it is able to provide up-to-date suggestions of relevant individuals in response to client requests.

Figure 5:
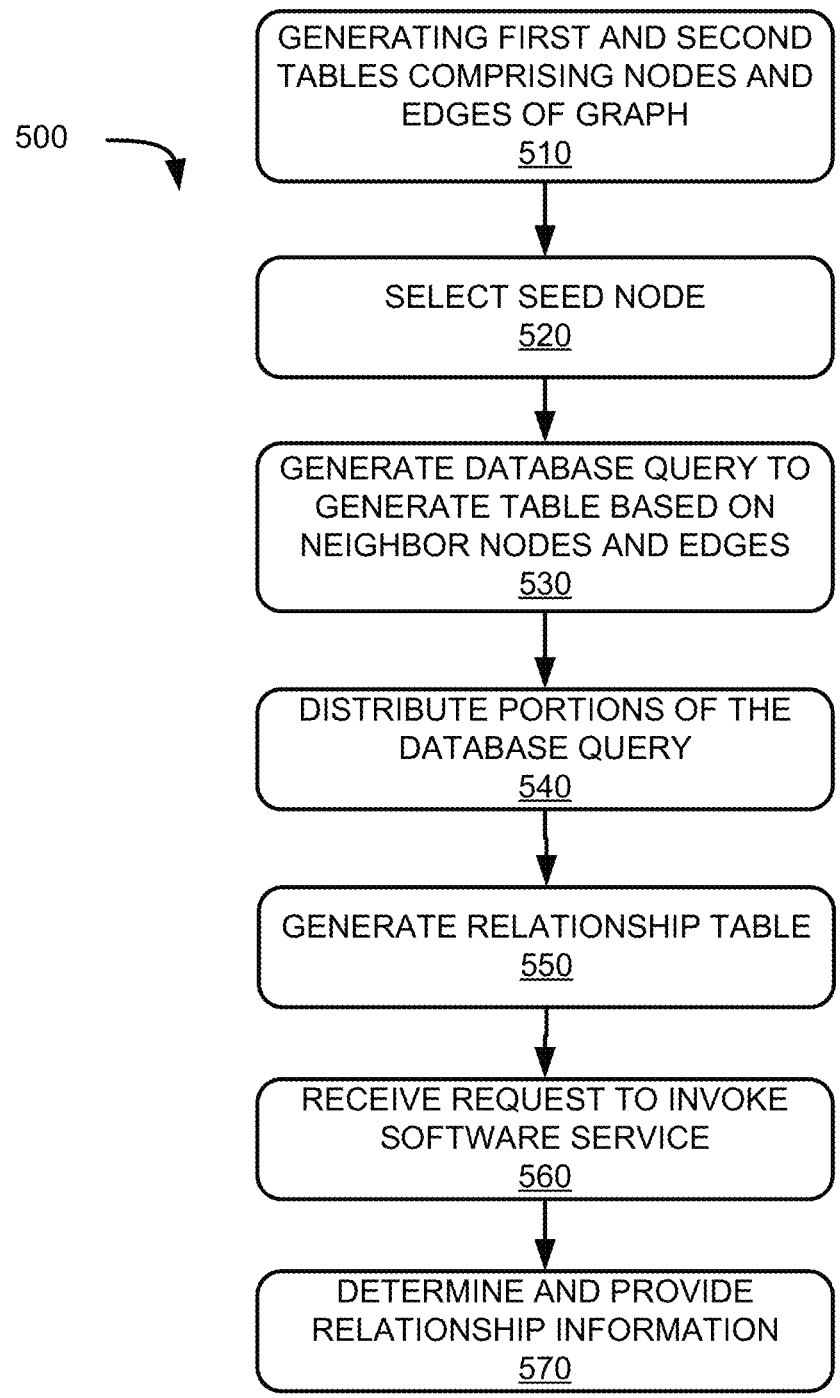
FIG. 5 shows an example method for determining relationships between nodes within connected graphs.

Referring now to FIG. 5, FIG. 5 shows an example method 500 for determining relationships between nodes withing connected graphs. The example method 500 will be discussed with respect to the example system 300 shown in FIG. 3A-3D; however, any suitable system according to this disclosure may be employed. Moreover, while this example is describe with respect to a virtual conference provider, it is not limited to virtual conference providers, but instead may be performed by any third-party or by an individual's own computing device.

At block 510, the relationship service 314 generates first and second tables from a relevancy graph 350 that includes nodes and edges, generally as discussed above with respect to FIG. 3B. As discussed above, the relationship service generates a node table and an edge table to represent information about all of the nodes and edges, respectively, within the relevancy graph 350.

At block 520, the relationship service 314 selects a seed node from the nodes in the relevancy graph 350, such as discussed above with respect to FIG. 3B. In this example, the relationship service selects a seed node randomly, though in some examples, the relationship service may select a seed node from the first row in the node table. Moreover, in some examples, the relationship service 314 may ultimately select every node in the relevancy graph as a seed node, as discussed above with respect to FIGS. 3B-3D.

At block 530, the relationship service 314 generates a database query to obtain data for a relationship table based on a set of neighbor nodes to the seed node and a set of corresponding edges connecting the seed node to each neighbor node of the set of neighbor nodes, generally as discussed above with respect to FIG. 3B. As discussed above, at a first iteration, the relationship service 314 generates a database query that obtains neighbor nodes and determines probabilities associated with those neighbor nodes. The probabilities in this example are based on a probability (a) of restarting a traversal of the relevancy graph 314 at the seed node and the weights of the edges connecting the seed node to the neighbor node. In subsequent iterations, the database queries may be obtain data related to connections between neighbor nodes and nodes connected to the neighbor nodes, and then nodes that are even more steps away from the seed node in the relevancy graph 350. Thus, a first iteration may involves generating probabilities for each of the possible edges that can be traversed from the seed node. Subsequent iterations may involve generating probabilities for each possible edge from each node reachable by traversing a single edge from the seed node, and then those that are reachable by traversing two edges from the seed node, and so forth until the probabilities in the relationship table stabilize. The iterative process may be performed generally as discussed above with respect to FIGS. 3B-3D.

It should be appreciated that the set of neighbor nodes does not necessarily include all of the neighbor nodes for the seed node in the relevancy graph 350. As discussed above, in some examples, a neighbor node may be any node in the relevancy graph that has a relationship with the seed node. However, some examples may limit the number of edges that may be traversed by the explorer, meaning that some relationships in the graph may be filtered, meaning that certain neighbor nodes are not considered by the relationship service 314 when performing the RWR algorithm.

At block 540, the relationship service 314 distributes portions of the database query to a plurality of computing nodes, in parallel, to determine probability information for the relationship table, generally as discussed above with respect to FIGS. 3B and 3D. In this example, JOIN operations for different nodes are distributed to available executors to execute the database operations from the assigned portion of the database query. However, in other examples, portions of a database query may be allocated according to different types of database commands included in the database query.

At block 550, the relationship service 314 generates a relevancy table 352 that includes the seed node, the set of neighbor nodes, and, for the seed node and each neighbor node, a corresponding probability based on the probability information, generally as discussed above with respect to FIGS. 3B and 3D. As discussed above, the relevancy table 352 may include rows that include the seed node, a corresponding neighbor node, and a corresponding probability of reaching that neighbor node, based on the restart probability, a. Further, as different seed nodes are selected, the relevancy table 352 may include rows representing multiple different seed nodes, including examples that include all nodes in the relevancy graph 350 having been analyzed as seed nodes.

At block 560, the relationship service 314 receives a request related to an individual and a software service, generally as discussed above with respect to FIGS. 3A-3B, and 4A-4C. For example, a user may wish to schedule a meeting with other users represented in the relevancy graph 350. Thus, the request may identify the user and request other users that have a close relationship with the user. In some cases, the request may identify the user and one or more other individuals, and may request information about the relationship of the user to the one or more individuals. Still other types of requests may be received as well.

At block 570, the relationship service 314 determines and provides information about a relationship between the individual and one or more individuals represented in the relevancy graph 352. In this example, the relationship service 314 accesses the relevancy table 352 and identifies one or more other individuals represented by nodes in the relevancy graph 350 based on the probability information stored in the relevancy table 352. For example, the relationship service 314 may determine the top five individuals in the relevancy table based on their corresponding probabilities. In some examples, the relationship service may determine probabilities indicating strengths of relationships between the individual and any other individuals identified in the request. The results may then be provided to the requesting computing device.

Figure 6:
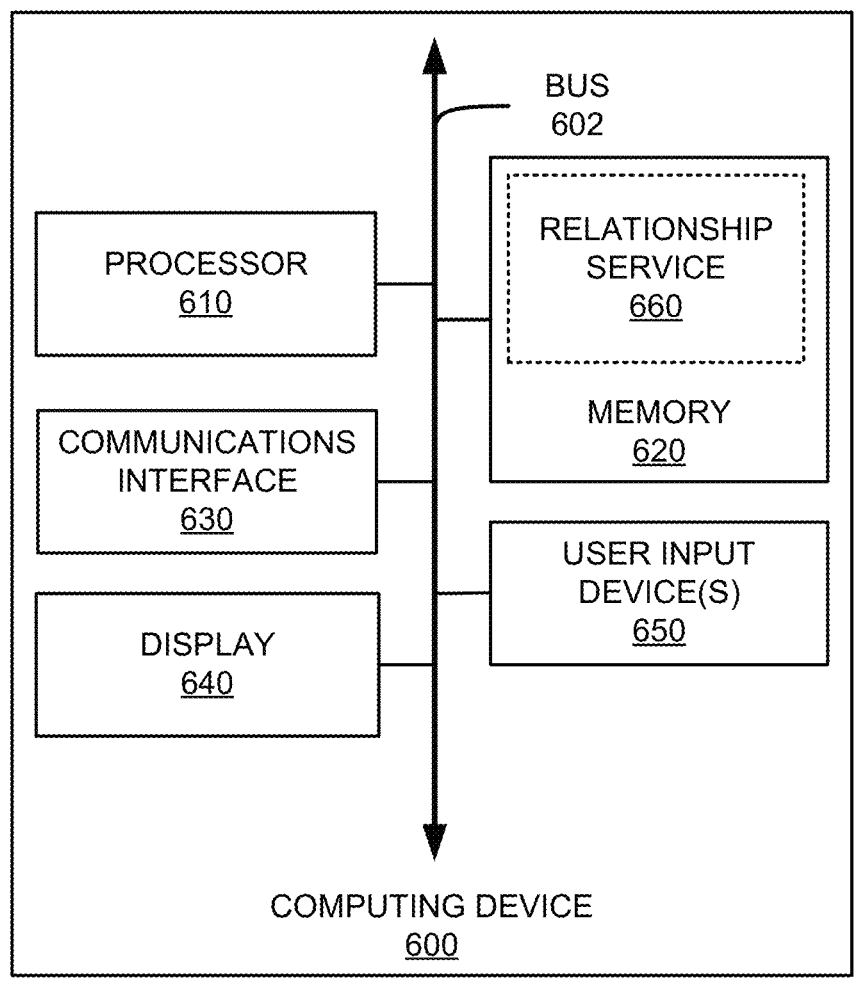
FIG. 6 shows an example computing device suitable for use with example systems and methods for determining relationships between nodes within connected graphs.

Referring now to FIG. 6, FIG. 6 shows an example computing device 600 suitable for use in example systems or methods for determining relationships between nodes within connected graphs according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for determining relationships between nodes within connected graphs according to different examples, such as part or all of the example method 500 described above with respect to FIG. 5. Suitable example computing devices 600, such as user client devices, may also include one or more user input devices 650, such as a keyboard, mouse, touchscreen, microphone, etc., to accept user input. The computing device 600 also includes a display 640 to provide visual output to a user. In addition, the computing device 600 includes relationship service 660, such as discussed above with respect to FIGS. 3A-3D.

The computing device 600 also includes a communications interface 630. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    generating, from a relevancy graph, a first table and a second table, the relevancy graph comprising a plurality of nodes and a plurality of edges, wherein each node represents an individual and each edge connects two nodes and represents a relationship between the respective two nodes, the first table comprising information about each node in the relevancy graph and the second table comprising information about each edge in the relevancy graph;
    selecting a seed node from the plurality of nodes;
    generating a database query to obtain data for a relevancy table based on a set of neighbor nodes to the seed node and a set of corresponding edges connecting the seed node to each neighbor node of the set of neighbor nodes;
    distributing, to a plurality of computing nodes, portions of the database query to determine, in parallel, probability information for the relevancy table;
    generating the relevancy table comprising the seed node, the set of neighbor nodes, and, for the seed node and each neighbor node, a corresponding probability based on the probability information;
    receiving, from a remote computing device, a request related to an individual and a software service offered by a service provider; and
    determining and providing, to the remote computing device based on the relevancy table, information about a relationship between the individual and one or more individuals represented in the relevancy graph.

2. The method of claim 1, further comprising, iteratively:
    generating a subsequent database query to obtain a further set of neighbor nodes to the set of neighbor nodes and further set of corresponding edges connecting the set of neighbor nodes to each neighbor node of the further set of neighbor nodes,
    distributing, to the plurality of computing nodes, a portion of the database query to determine, in parallel, further probability information for the relevancy table,
    updating the relevancy table based on the further probability information.

3. The method of claim 2, further comprises repeating the method at a predetermined time interval to generate new probability information.

4. The method of claim 1, further comprising sorting, for each node in the relevancy graph, the edges corresponding to the node, and wherein the database query limits a number of edges to a predetermined limit.

5. The method of claim 4, wherein the predetermined limit is based on Dunbar's number.

6. The method of claim 1, wherein selecting a seed node comprises iteratively selecting every node in the relevancy graph as the seed node.

7. The method of claim 1, wherein the database query comprises a plurality of JOIN statements corresponding to different neighbor nodes, and wherein distributing, to a plurality of computing nodes, the portions of the database query comprises distributing JOIN statements corresponding to a respective neighbor node of the set of neighbor nodes to one of the computing nodes of the plurality of computing nodes.

8. The method of claim 1, wherein each corresponding probability is based on a predetermined probability of returning to the seed node during a random walk.

9. A system comprising:
    a communications interface;
    a non-transitory computer-readable medium; and
    one or more processors configured to execute processor-executable instructions stored in the non-transitory computer-readable medium to:
        generate, from a relevancy graph, a first table and a second table, the relevancy graph comprising a plurality of nodes and a plurality of edges, wherein each node represents an individual and each edge connects two nodes and represents a relationship between the respective two nodes, the first table comprising information about each node in the relevancy graph and the second table comprising information about each edge in the relevancy graph;

select a seed node from the plurality of nodes;

generate a database query to obtain data for a relevancy table based on a set of neighbor nodes to the seed node and a set of corresponding edges connecting the seed node to each neighbor node of the set of neighbor nodes;

distribute, to a plurality of computing nodes, portions of the database query to determine, in parallel, probability information for the relevancy table;

generate the relevancy table comprising the seed node, the set of neighbor nodes, and, for the seed node and each neighbor node, a corresponding probability based on the probability information; and receive, from a remote computing device, a request related to an individual and a software service offered by a service provider; and determine and provide, to the remote computing device based on the relevancy table, information about a relationship between the individual and one or more individuals represented in the relevancy graph.

10. The system of claim 9, wherein the one or more processors are configured to execute further processor-executable instructions stored in the non-transitory computer-readable medium to, iteratively:

generate a subsequent database query to obtain a further set of neighbor nodes to the set of neighbor nodes and further set of corresponding edges connecting the set of neighbor nodes to each neighbor node of the further set of neighbor nodes, distribute, to the plurality of computing nodes, a portion of the database query to determine, in parallel, further probability information for the relevancy table, update the relevancy table based on the further probability information.

11. The system of claim 10, wherein the one or more processors are configured to execute further processor-executable instructions stored in the non-transitory computer-readable medium to repeat at a predetermined time interval to generate new probability information.

12. The system of claim 9, wherein the one or more processors are configured to execute further processor-executable instructions stored in the non-transitory computer-readable medium to sort, for each node in the relevancy graph, the edges corresponding to the node, and wherein the database query limits a number of edges to a predetermined limit.

13. The system of claim 12, wherein the predetermined limit is based on Dunbar's number.

14. The system of claim 9, wherein the one or more processors are configured to execute further processor-executable instructions stored in the non-transitory computer-readable medium to iteratively select every node in the relevancy graph as the seed node.

15. The system of claim 9, wherein the database query comprises a plurality of JOIN statements corresponding to different neighbor nodes, and wherein the one or more processors are configured to execute further processor-executable instructions stored in the non-transitory computer-readable medium to distribute JOIN statements corresponding to a respective neighbor node of the set of neighbor nodes to one of the computing nodes of the plurality of computing nodes.

16. The system of claim 9, wherein each corresponding probability is based on a predetermined probability of returning to the seed node during a random walk.

17. A non-transitory computer-readable medium comprising processor-executable instructions configured to cause one or more processors to:

generate, from a relevancy graph, a first table and a second table, the relevancy graph comprising a plurality of nodes and a plurality of edges, wherein each node represents an individual and each edge connects two nodes and represents a relationship between the respective two nodes, the first table comprising information about each node in the relevancy graph and the second table comprising information about each edge in the relevancy graph;

select a seed node from the plurality of nodes;

generate a database query to obtain data for a relevancy table based on a set of neighbor nodes to the seed node and a set of corresponding edges connecting the seed node to each neighbor node of the set of neighbor nodes;

distribute, to a plurality of computing nodes, portions of the database query to determine, in parallel, probability information for the relevancy table;

generate the relevancy table comprising the seed node, the set of neighbor nodes, and, for the seed node and each neighbor node, a corresponding probability based on the probability information; and receive, from a remote computing device, a request related to an individual and a software service offered by a service provider; and determine and provide, to the remote computing device based on the relevancy table, information about a relationship between the individual and one or more individuals represented in the relevancy graph.

18. The non-transitory computer-readable medium of claim 17, further comprising processor-executable instructions configured to cause the one or more processors to, iteratively:

generate a subsequent database query to obtain a further set of neighbor nodes to the set of neighbor nodes and further set of corresponding edges connecting the set of neighbor nodes to each neighbor node of the further set of neighbor nodes, distribute, to the plurality of computing nodes, a portion of the database query to determine, in parallel, further probability information for the relevancy table, update the relevancy table based on the further probability information.

19. The non-transitory computer-readable medium of claim 17, further comprising processor-executable instructions configured to cause the one or more processors to sort, for each node in the relevancy graph, the edges corresponding to the node, and wherein the database query limits a number of edges to a predetermined limit.

20. The non-transitory computer-readable medium of claim 17, further comprising processor-executable instructions configured to cause the one or more processors to iteratively select every node in the relevancy graph as the seed node.

* * * * *